United States Patent
Okaichi et al.

(10) Patent No.: US 9,702,263 B2
(45) Date of Patent: Jul. 11, 2017

(54) RANKINE CYCLE DEVICE

(71) Applicant: Panasonic Intellectual Property Management Co., Ltd., Osaka (JP)

(72) Inventors: Atsuo Okaichi, Osaka (JP); Osao Kido, Kyoto (JP); Takumi Hikichi, Osaka (JP); Osamu Kosuda, Osaka (JP); Noriyoshi Nishiyama, Osaka (JP); Yoshio Tomigashi, Osaka (JP); Masaaki Konoto, Kyoto (JP); Subaru Matsumoto, Osaka (JP); Tetsuya Matsuyama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 14/635,307

(22) Filed: Mar. 2, 2015

(65) Prior Publication Data
US 2015/0252685 A1 Sep. 10, 2015

(30) Foreign Application Priority Data

Mar. 10, 2014 (JP) .................................. 2014-045956

(51) Int. Cl.
*F01D 17/08* (2006.01)
*F01K 25/08* (2006.01)
(Continued)

(52) U.S. Cl.
CPC ............ *F01D 17/085* (2013.01); *F01K 9/003* (2013.01); *F01K 13/02* (2013.01); *F01K 25/08* (2013.01);
(Continued)

(58) Field of Classification Search
CPC ........ F01D 17/085; F01K 25/08; F01K 13/02; F01K 9/003; F22B 1/18; Y02E 20/14; F05D 2270/303; F05D 2210/12; F05D 2220/31
(Continued)

(56) References Cited

U.S. PATENT DOCUMENTS 5,724,814 A * 3/1998 Ven .......................... F01B 17/00
  60/618
6,581,384 B1 * 6/2003 Benson .................... F01K 25/08
  60/653
(Continued)

FOREIGN PATENT DOCUMENTS

DE 10221594 11/2003
EP 2204902 7/2010
(Continued)

OTHER PUBLICATIONS

The Extended European Search Report dated Jul. 30, 2015 for the related European Patent Application No. 15157479.5.

*Primary Examiner* — Hoang Nguyen
(74) *Attorney, Agent, or Firm* — McDermott Will & Emery LLP

(57) ABSTRACT

A Rankine cycle device in the present disclosure includes an evaporator as a heater, an expander, a cooler, a first temperature sensor, a second temperature sensor, and a control device. The first temperature sensor detects a temperature of the working fluid flowing from an outlet of the heater to an inlet of the expander in the circuit of the working fluid. The second temperature sensor detects a temperature of the working fluid flowing from an outlet of the expander to an inlet of the cooler. The controller controls a number of rotation of the expander based on a difference between a (Continued)

detected temperature of the first temperature sensor and a detected temperature of the second temperature sensor.

13 Claims, 13 Drawing Sheets

(51) Int. Cl.
  *F01K 13/02* (2006.01)
  *F01K 9/00* (2006.01)
  *F22B 1/18* (2006.01)
(52) U.S. Cl.
  CPC ............ *F22B 1/18* (2013.01); *F05D 2210/12* (2013.01); *F05D 2220/31* (2013.01); *F05D 2270/303* (2013.01); *Y02E 20/14* (2013.01)
(58) Field of Classification Search
  USPC .......................................... 60/660, 670, 671
  See application file for complete search history.

(56) References Cited

U.S. PATENT DOCUMENTS

| | | | |
|---|---|---|---|
| 8,093,733 B2* | 1/2012 | Yuri | ...................... F01K 23/065 290/2 |
| 8,893,495 B2* | 11/2014 | Dane | ...................... F01K 23/065 60/273 |
| 2003/0213246 A1* | 11/2003 | Coll | ........................ F01K 17/02 60/653 |
| 2004/0103661 A1 | 6/2004 | Ohta et al. | |
| 2009/0071156 A1 | 3/2009 | Nishikawa et al. | |

FOREIGN PATENT DOCUMENTS

| | | |
|---|---|---|
| JP | 2001-165513 | 6/2001 |
| JP | 2002-155707 | 5/2002 |
| WO | 2012/085262 | 6/2012 |

* cited by examiner

RANKINE CYCLE DEVICE

BACKGROUND

1. Technical Field

The present disclosure relates to a Rankine cycle device.

2. Description of the Related Art

Conventionally, Rankine cycle devices are known as devices to carry out power generation. As an example of such Rankine cycle device, there is a known configuration where a working fluid is expanded by a displacement expander to recover power. As illustrated in FIG. 13, Japanese Unexamined Patent Application Publication No. 2002-155707 discloses a Rankine cycle device 600 having an evaporator 603, an expander 604, a condenser 605, and a supply pump 606. The evaporator 603 generates a vapor at high temperatures and high pressures using waste heat of an internal combustion engine 601 as a heat source.

In the Rankine cycle device 600, a pressure Pevp and a temperature Tevp of the vapor supplied to the expander 604 are adjusted to satisfy predetermined relationship. The pressure Pevp of the vapor is adjusted by controlling a number of rotation of the expander 604, and the temperature Tevp of the vapor is adjusted by controlling the amount of water supplied to the evaporator 603. At this time, a ratio of expansion of the expander 604 is set at a predetermined ratio of expansion (set ratio ϵ of expansion), thereby matching a pressure Pexp2 and a temperature Texp2 of the vapor discharged from the expander 604 to a rated value. As a result, it is possible that the expander 604 and the condenser 605 exhibit maximum performance. When the pressure Pevp and the temperature Tevp of the vapor are out of the predetermined relationship, by changing the ratio of expansion of the expander 604, the pressure Pexp2 and the temperature Texp2 of the vapor discharged from the expander 604 are matched to optimum values.

As illustrated in FIG. 15, Japanese Unexamined Patent Application Publication No. 2001-165513 discloses a refrigeration air conditioner 901 having a compressor 902, a radiator 916, an expander 903, and an evaporator 917. The refrigeration air conditioner 901 has an inlet pressure detector 941, an outlet pressure detector 942, an expansion ratio controller 943, and a calculator 944. The inlet pressure detector 941 detects a pressure at an inlet of the expander 903, and the outlet pressure detector 942 detects a pressure at an outlet of the expander 903. As the inlet pressure detector 941 and the outlet pressure detector 942, pressure sensors are used. Based on detection signals of the inlet pressure detector 941 and the outlet pressure detector 942, the calculator 944 calculates a target ratio of expansion. The expansion ratio controller 943 controls the expander 903 to expand a refrigerant 905 at the target ratio of expansion. In such a manner, the pressure after expansion of the refrigerant 905 introduced to the expander 903 is made equivalent to the pressure at the outlet of the expander 903. In Japanese Unexamined Patent Application Publication No. 2001-165513, there is a description that a temperature sensor may be provided at an outlet of the expander 903 to detect the temperature of the refrigerant 905, thereby obtaining the pressure at the outlet of the expander 903 based on the detected value.

SUMMARY

In the Rankine cycle device 600 of Japanese Unexamined Patent Application Publication No. 2002-155707, the pressure of the vapor is detected to control behaviors of the expander.

One non-limiting and exemplary embodiment provides a Rankine cycle device that is capable of controlling behaviors of the expander with a relatively simple configuration.

In one general aspect, the techniques disclosed here feature a Rankine cycle device that includes an evaporator as a heater, an expander, a cooler, a first temperature sensor, a second temperature sensor, and a control device. The first temperature sensor detects a temperature of the working fluid flowing from an outlet of the heater to an inlet of the expander in the circuit of the working fluid. The second temperature sensor detects a temperature of the working fluid flowing from an outlet of the expander to an inlet of the cooler. The controller controls a number of rotation of the expander based on a difference between a detected temperature of the first temperature sensor and a detected temperature of the second temperature sensor.

According to the above Rankine cycle device, it is possible to evaluate a ratio of expansion of the Rankine cycle device and control behaviors of the expander with a relatively simple configuration.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 14A:
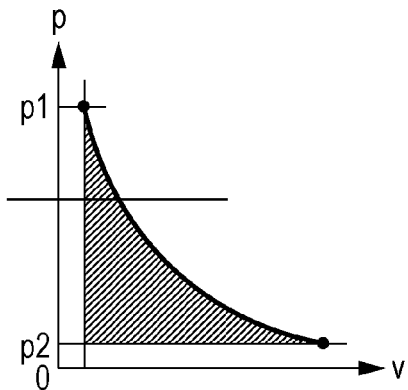
FIG. 14A is a graph illustrating changes in a pressure and a specific volume of a working fluid in an expander of a Rankine cycle device in rating.
Figure 14B:
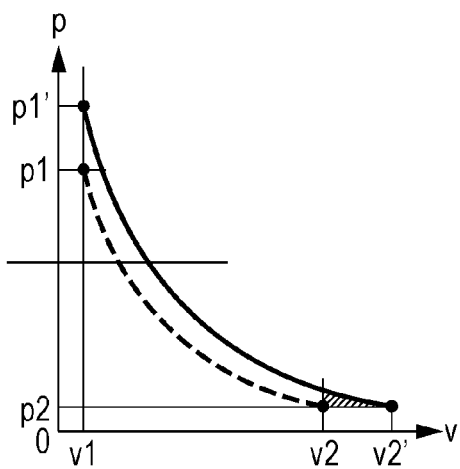
FIG. 14B is a graph illustrating changes in a pressure and a specific volume of a working fluid in an expander when an inlet pressure of an expander is high.
Figure 14C:
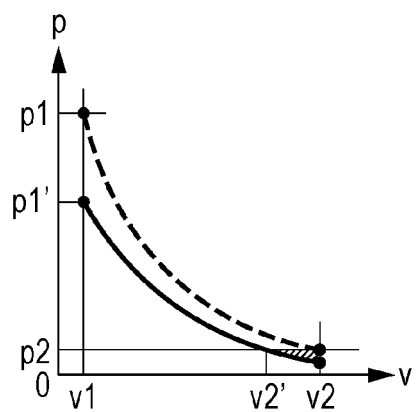
FIG. 14C is a graph illustrating changes in a pressure and a specific volume of a working fluid in an expander when an inlet pressure of an expander is low.
Figure 15:
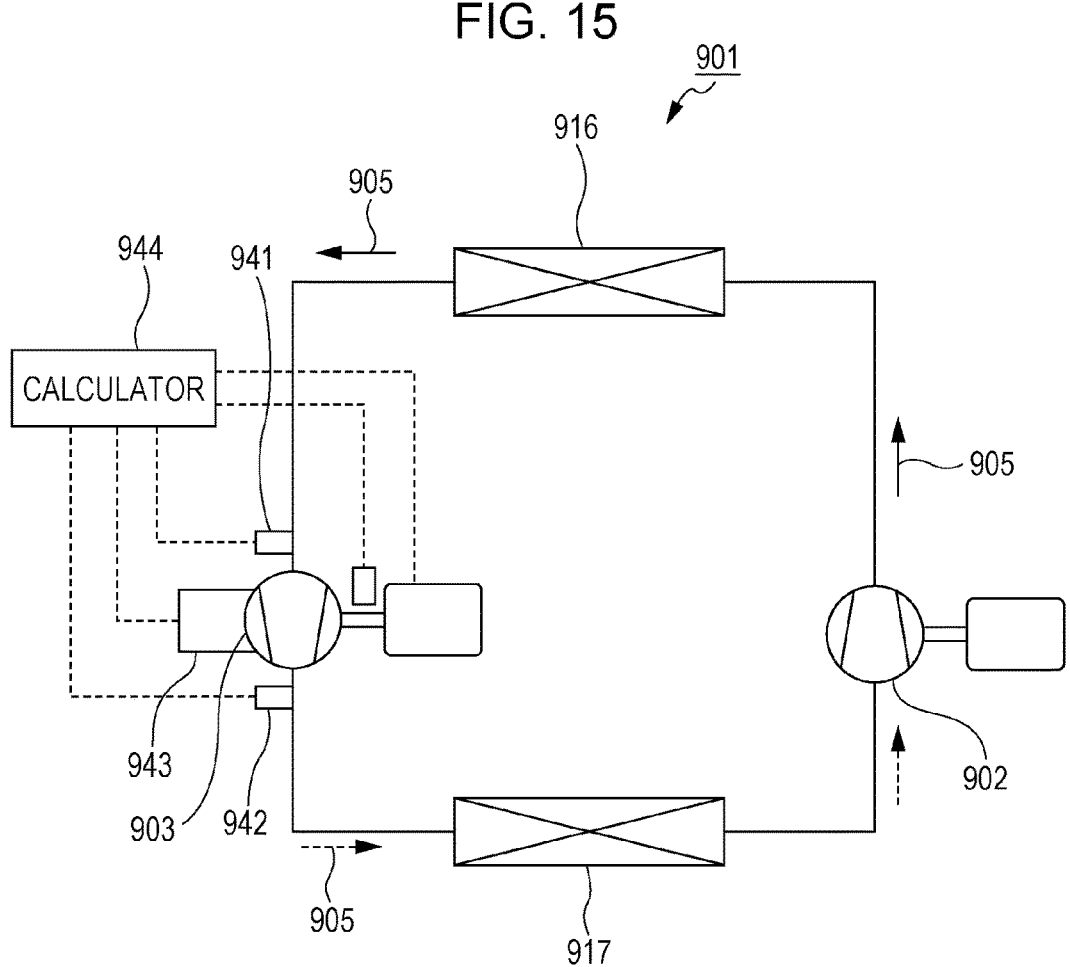
FIG. 15 is a configuration diagram of a conventional refrigeration air conditioner.

In a displacement expander included in a Rankine cycle device, an intake volume and a discharge volume are determined by the design specifications. A working fluid that has flown in the expander expands in accordance with a ratio of the intake volume and the expanded volume and the pressure of the working fluid is lowered. As illustrated in FIG. 14A, a working fluid having a pressure at an inlet of an expander of a rated value p1 in rating is expanded inside the expander at a predetermined ratio of expansion and a pressure of the working fluid at an outlet of the expander becomes a rated value p2. At this time, the expander is capable of exhibiting the maximum performance. In such a manner, a ratio of expansion at which an expander is capable of exhibiting the maximum performance is referred to as a design expansion ratio. In contrast, as illustrated in FIG. 14B, when the pressure of the working fluid at the inlet of the expander is higher than the rated value p1 and the pressure of the working fluid expanded up to a discharge specific volume v2 is higher than the rated value p2, pressure energy of the working fluid that is not recovered as power turns out to be released. Therefore, there is a loss in the amount of recovered power by the expander. That is, the work equivalent to the hatched area in FIG. 14B turns out to be in vain. As illustrated in FIG. 14C, when the pressure of the working fluid at the inlet of the expander is lower than the rated value p1 and the pressure of the working fluid expanded up to the discharge specific volume v2 is lower than the rated value p2, the working fluid turns out to be drawn to a pressure lower than the rated value p2. Consequently, negative work equivalent to the hatched area in FIG. 14C occurs and there is a loss in the amount of recovered power by the expander.

Therefore, for example, a ratio of expansion of a Rankine cycle device is evaluated to adjust an evaporating pressure of the Rankine cycle device so as to be adapted to the design expansion ratio of the expander. In the Rankine cycle device 600 of Japanese Unexamined Patent Application Publication No. 2002-155707, in order that the pressure Pevp and the temperature Tevp of the vapor supplied to the expander 604 satisfy predetermined relationship, the pressure Pevp is adjusted by controlling the number of rotation of the expander 604. In this case, the pressure Pevp is detected directly. Japanese Unexamined Patent Application Publication No. 2001-165513 describes that an outlet pressure of the expander 903 may be obtained by providing a temperature sensor at an outlet of the expander 903 and detecting the temperature of the refrigerant. However, it is difficult to obtain the pressure Pevp by a temperature sensor. It is because, in the Rankine cycle device 600, the working fluid at the inlet of the expander 604 is a superheated vapor in most cases and it is not possible to uniquely obtain the pressure of the vapor from the temperature of the vapor. Therefore, the Rankine cycle device 600 is provided with a pressure sensor to detect the pressure Pevp of the vapor supplied to the expander 604. Since a pressure sensor is generally expensive, costs for manufacturing the Rankine cycle device turns out to be high.

The present inventor has found that, not limited to control of the above ratio of expansion, it is possible to control of an expander, used to be conventionally carried out using a pressure sensor, using a temperature difference between the inlet and the outlet of the expander.

A first aspect of the present disclosure provides a Rankine cycle device including a heater that generates a superheated vapor of the working fluid, an expander that expands the working fluid having passed through the heater, a cooler that cools the working fluid having passed through the expander, a first temperature sensor that detects a temperature of the working fluid flowing from an outlet of the heater to an inlet of the expander, a second temperature sensor that detects a temperature of the working fluid flowing from an outlet of the expander to an inlet of the cooler, and a control device (controller) that controls a number of rotation of the expander based on a difference between the detected temperature of the first temperature sensor and the detected temperature of the second temperature sensor.

According to the first aspect of the present disclosure, it is possible to control the expander based on, instead of a pressure difference between the inlet and the outlet of the expander, a difference between a value detected by the first temperature sensor and a value detected by the second temperature sensor.

In addition, it is possible to apply the above control to arbitrary control of the expander using a pressure difference.

Here, the heater may be in any mode as long as it generates a superheated vapor. For example, the heater may be an apparatus (evaporator) that carries out generation of a vapor from the working fluid and also generates a superheated vapor by further heating the vapor. The heater may also be a superheater that is provided downstream of the evaporator to carry out generation of a vapor from the working fluid and generates a superheated vapor by further heating the vapor generated in the evaporator.

When there is a plurality of coolers, the second temperature sensor detects a temperature of the working fluid flowing from an outlet of the expander to an inlet of the cooler closest to the expander in the circuit.

A second aspect in the present disclosure provides the Rankine cycle device according to the first aspect, in which the control device increases the number of rotation of the expander when the difference increases.

According to the second aspect, an excessive rise in a pressure difference between the inlet and the outlet of the expander is alleviated.

A third aspect in the present disclosure provides the Rankine cycle device according to the first or second aspect, in which the control device decreases the number of rotation of the expander when the difference decreases.

According to the third aspect, an excessive decrease in a pressure difference between the inlet and the outlet of the expander is alleviated.

A fourth aspect in the present disclosure provides the Rankine cycle device according to the first aspect, in which the control device controls the number of rotation of the expander to make the difference closer to a target value.

According to the fourth aspect, it is possible to appropriately control a ratio of expansion of the expander based on a difference between a value detected by the first temperature sensor and a value detected by the second temperature sensor.

Therefore, the Rankine cycle device does not have to be provided with a pressure sensor to control behaviors of the expander, so that it is possible to control behaviors of the expander at an appropriate ratio of expansion of the Rankine cycle device with a relatively simple configuration.

A fifth aspect in the present disclosure provides the Rankine cycle device according to the fourth aspect, in which the control device increases the number of rotation of the expander when the difference is more than the target value.

When a difference between a value detected by the first temperature sensor and a value detected by the second temperature sensor is more than a target value, a ratio of expansion of the Rankine cycle device is more than the ratio of expansion of the Rankine cycle device in a target state. According to the fifth aspect, the flow rate of the working fluid in the gas phase produced in the heater by increasing the number of rotation of the expander to the condenser increases. Thus, the mass of the working fluid flowing to the condenser through the expander becomes more than the mass of the working fluid evaporating in the evaporator, so that the evaporating pressure lowers and the ratio of expansion of the Rankine cycle device gets closer to the ratio of expansion of the Rankine cycle device in a target state.

Here, when the difference is more than the target value, to increase the number of rotation of the expander, the number of rotation of the expander does not have to be increased in the entire period in which the difference is greater than the target value as long as the number of rotation of the expander is increased in at least a part of the period. For example, when the difference is a first threshold more than the target value or greater, the controller may also increase the number of rotation of the expander.

In addition, it is possible to appropriately set the target state by the design of the Rankine cycle device.

The target state may be a state, for example, where the Rankine cycle device achieves a design expansion ratio of the expander.

The target state is also a state of achieving a ratio of expansion not depending on a temperature of a cooling fluid that cools the working fluid by a cooler when the pressure of the working fluid having passed through the heater is maintained and the pressure of the working fluid after passing through the expander varies by the temperature of the cooling fluid. At this time, in the ratio of expansion different from the design expansion ratio, while the efficiency of the expander lowers, the efficiency of power generation improves when the temperature of the cooling fluid lowers.

A sixth aspect in the present disclosure provides the Rankine cycle device according to the fourth or fifth aspect, in which the control device decreases the number of rotation of the expander when the difference is less than the target value.

The ratio of expansion of the Rankine cycle device when a subtraction of a temperature detected by the second temperature sensor from a temperature detected by the first temperature sensor is less than the target value is less than the ratio of expansion of the Rankine cycle device in the target state. According to the sixth aspect, the flow rate to the condenser of the working fluid in the gas phase produced in the evaporator by decreasing the number of rotation of the expander is decreased. Thus, the mass of the working fluid flowing to the condenser through the expander becomes less than the mass of the working fluid evaporating in the evaporator, so that the evaporating pressure increases and the ratio of expansion of the Rankine cycle device gets closer to the ratio of expansion of the Rankine cycle device in a target state. As a result, the Rankine cycle device is operated in a target state or a state close to the target state, so that the performance of the Rankine cycle device is enhanced.

Here, when the difference is less than the target value, to decrease the number of rotation of the expander, the number of rotation of the expander does not have to be decreased in the entire period in which the difference is less than the target value as long as the number of rotation of the expander is decreased in at least a part of the period. For example, when the difference is a second threshold less than the target value or lower, the controller may also decrease the number of rotation of the expander.

In addition, it is possible to appropriately set the above target state by the design of the Rankine cycle device.

The target state may be a state where the Rankine cycle device achieves the design expansion ratio of the expander, for example.

In addition, the target state is a state of achieving the ratio of expansion, not depending on the temperature of a cooling fluid that cools the working fluid by the cooler, when the pressure (evaporating pressure) of the working fluid having passed through the heater is maintained and the pressure of the working fluid after passing through the expander varies by the temperature of the cooling fluid. At this time, in the ratio of expansion different from the design expansion ratio, while the efficiency of the expander lowers, the efficiency of power generation improves when the temperature of the cooling fluid lowers.

A seventh aspect in the present disclosure provides the Rankine cycle device according to the second or third aspect, in which the cooler includes a condenser has a flow passage of a cooling fluid for condensation that cools the working fluid by the cooling fluid for condensation, the Rankine cycle device further includes a third temperature sensor that detects a temperature of the cooling fluid that is a cooled working fluid after passing through the condenser, and the control device decreases the number of rotation of the expander when the detected temperature of the third temperature sensor rises.

When the detected temperature of the third temperature sensor rises, the pressure of the working fluid at the outlet of the condenser and eventually the pressure of the working fluid at the outlet of the expander increase. At this time, in order to reduce the change in the ratio of expansion of the expander, the pressure difference (temperature difference) between the inlet and the outlet of the expander is increased. According to the seventh aspect, when the detected temperature of the third temperature sensor rises, it is possible to reduce a gap of the ratio of expansion of the Rankine cycle device relative to the design expansion ratio of the expander.

An eighth aspect in the present disclosure provides the Rankine cycle device according to the seventh aspect, in which the control device increases the number of rotation of the expander when the temperature detected by the third temperature sensor lowers.

When the detected temperature of the third temperature sensor lowers, the pressure at the outlet of the condenser and eventually the pressure at the outlet of the expander lower. At this time, the pressure on the inlet side of the expander does not change when the outputs of the pump and the expander are constant, so that the difference between the intake pressure and the discharge pressure of the expander becomes large and the mechanical load on the expander becomes large. According to the eighth aspect, it is possible to reduce the difference between the intake pressure of the expander and the discharge pressure of the expander and it is possible to reduce mechanical load on the expander.

A ninth aspect in the present disclosure provides the Rankine cycle device according to the second aspect in which the cooler includes a condenser that has a flow passage of a cooling fluid for condensation and that cools the working fluid by the cooling fluid, the Rankine cycle device further includes a third temperature sensor that detects a temperature of the cooling fluid after passing through the condenser, and the control device increases the number of rotation of the expander when the detected temperature of the third temperature sensor rises and also decreases the number of rotation of the expander when the detected temperature of the third temperature sensor lowers.

According to the ninth aspect, for example, when the cold source temperature is low, it is possible to operate the Rankine cycle device by keeping the evaporating pressure of the Rankine cycle device at an evaporating pressure of the Rankine cycle device when the cold source temperature is high or a pressure close to the evaporating pressure. Therefore, it is possible to operate the Rankine cycle device in a state where the efficiency of power generation is high.

In the ninth aspect, the control device may also increase the number of rotation of the expander when the detected temperature of the third temperature sensor rises. Thus, it is possible to perform control of the expander in a state of maintaining the pressure on the inlet side of the expander at an upper limit pressure or less. The upper limit pressure may be, for example, an upper limit pressure that is regulated by safety standards and the like.

A tenth aspect in the present disclosure provides the Rankine cycle device according to any one of the fourth to sixth aspects, in which the cooler includes a condenser that has a flow passage of a cooling fluid for condensation and that cools the working fluid by the cooling fluid for condensation, the Rankine cycle device further includes a third temperature sensor that detects a temperature of the cooling fluid that is a cooled working fluid after passing through the condenser, and the control device sets the target value in accordance with the temperature detected by the third temperature sensor and controls the number of rotation of the expander based on the set target value.

According to the tenth aspect, based on the temperature of the cooling fluid (cold source temperature) at an outlet of the flow passage of the cooling fluid of the condenser, the above target value is determined. Further, based on the target value, the number of rotation of the expander is controlled. Thus, it is possible to define the target value considering the pressure of the working fluid after passing through the condenser of the Rankine cycle device, so that it is possible to enhance performance of the Rankine cycle device.

An eleventh aspect in the present disclosure provides the Rankine cycle device according to the tenth aspect, in which the control device increases the target value when the detected temperature of the third temperature sensor rises and controls the number of rotation of the expander based on the increased target value. When the detected temperature of the third temperature sensor rises, the pressure of the working fluid at the outlet of the condenser and eventually the pressure of the working fluid at the outlet of the expander increase. At this time, in order to reduce the change in the ratio of expansion of the expander, the pressure difference (temperature difference) between the inlet and the outlet of the expander is increased. Accordingly, to maintain the target value of the temperature difference when the detected temperature of the third temperature sensor rises causes the gap of the ratio of expansion of the Rankine cycle device becoming large relative to the design expansion ratio of the expander. According to the eleventh aspect, when the detected temperature of the third temperature sensor rises, it is possible to reduce the gap of the ratio of expansion of the Rankine cycle device relative to the design expansion ratio of the expander.

A twelfth aspect in the present disclosure provides the Rankine cycle device according to the tenth or eleventh aspect, in which the control device decreases the target value when the temperature detected by the third temperature sensor lowers and controls the number of rotation of the expander based on the decreased target value.

When the detected temperature of the third temperature sensor lowers, the pressure at the outlet of the condenser and eventually the pressure at the outlet of the expander lower. At this time, the pressure on the inlet side of the expander does not change when the outputs of the pump and the expander are constant, so that the difference between the intake pressure and the discharge pressure of the expander becomes large and the mechanical load on the expander becomes large. According to the twelfth aspect, it is possible to reduce the difference between the intake pressure of the expander and the discharge pressure of the expander and it is possible to reduce the mechanical load on the expander. As a result, it is possible to enhance the reliability of the Rankine cycle device.

A thirteenth aspect in the present disclosure provides the Rankine cycle device according to the tenth aspect, in which the control device increases the target value when the detected temperature of the third temperature sensor lowers and controls the number of rotation of the expander based on the increased target value. According to the thirteenth aspect, for example, when the cold source temperature is low, it is possible to operate the Rankine cycle device by keeping the evaporating pressure of the Rankine cycle device at an evaporating pressure of the Rankine cycle device when the cold source temperature is high or a pressure close to the evaporating pressure. Therefore, it is possible to operate the Rankine cycle device in a state where the efficiency of power generation is high.

In the thirteenth aspect, the control device may decrease the target value when the temperature detected by the third temperature sensor rises and control the number of rotation of the expander based on the decreased target value. Thus, it is possible to perform control of the expander in a state of maintaining the pressure on the inlet side of the expander at an upper limit pressure or less. The upper limit pressure may also be, for example, an upper limit pressure that is regulated by safety standards and the like.

Descriptions are given below to embodiments of the present disclosure with reference to the drawings. The descriptions below relate to an example of the present disclosure and the present disclosure is not limited to them.

Figure 1:
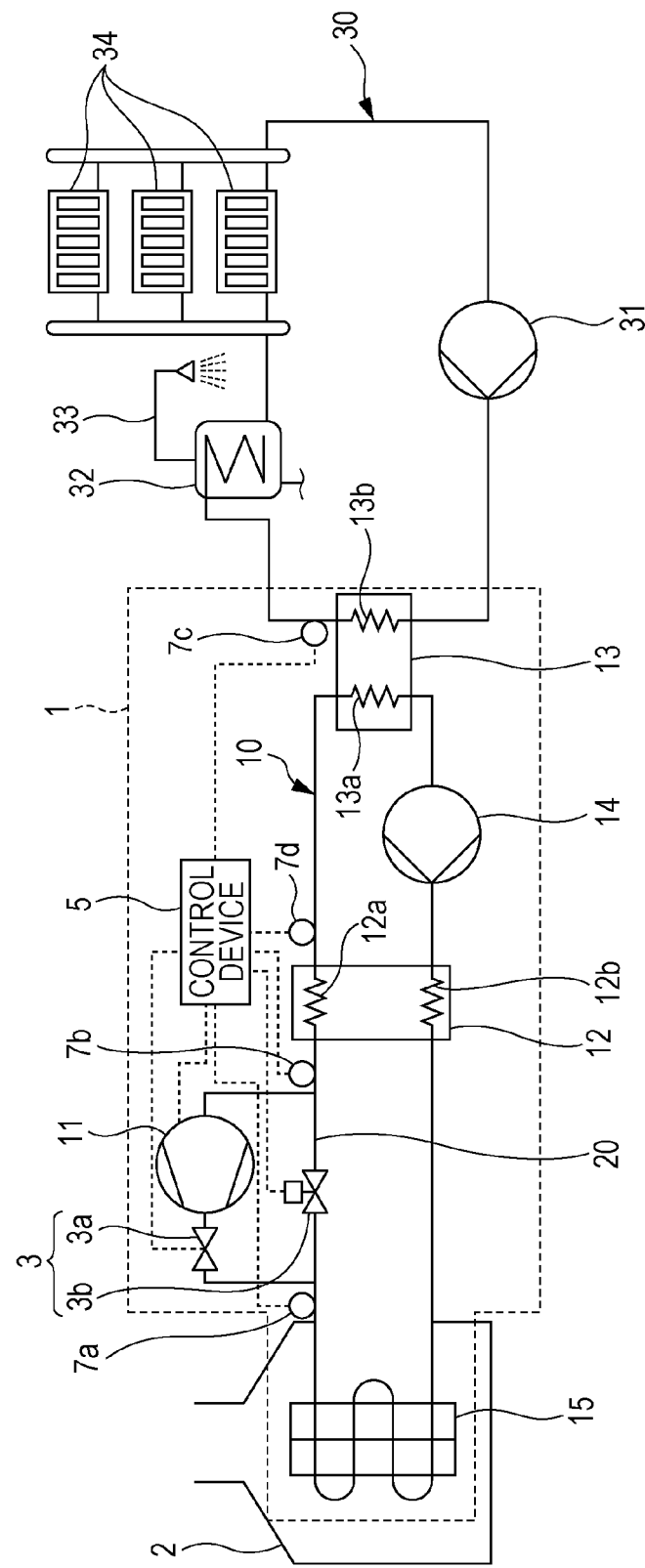
FIG. 1 is a configuration diagram of a Rankine cycle device according to an example of the present disclosure.

As illustrated in FIG. 1, a Rankine cycle device 1 is provided with a main circuit 10, an expander 11, a first temperature sensor 7a, and a second temperature sensor 7b. The main circuit 10 is a circuit of a working fluid. The expander 11 is a fluid machine to expand the working fluid. In addition, the Rankine cycle device 1 is further provided with a bypass passage 20, a flow adjustment mechanism 3, a third temperature sensor 7c, and a temperature sensor 7d. The main circuit 10 has the expander 11, a first heat exchange unit 12a, a condenser 13, a pump 14, a second heat exchange unit 12b, and an evaporator 15 and is formed by connecting these components in a loop in this order. The working fluid flows through the expander 11, the first heat exchange unit 12a, the condenser 13, the pump 14, the second heat exchange unit 12b, and the evaporator 15 in the main circuit 10 in this order. The first heat exchange unit 12a and the second heat exchange unit 12b configure a reheater 12. The first heat exchange unit 12a forms a lower pressure passage of the reheater 12. The second heat exchange unit 12b forms a higher pressure passage of the reheater 12. The working fluid in the first heat exchange unit 12a exchanges heat with the working fluid in the second heat exchange unit 12b. The reheater 12 is an example of a cooler in the present disclosure.

The working fluid is not limited in particular. The working fluid is, for example, water, ketone, alcohol, hydrocarbon, or fluorocarbon. Such alcohol may include, for example, ethanol. Such hydrocarbon may include, for example, n-butane or n-pentane. Such fluorocarbon may include, for example, R134a, R1234yf, R1234ze(E), R1234ze(Z), R236fa, R236ea, R245fa, or R365mfc.

The evaporator 15 generates a superheated vapor of the working fluid. Specifically, the evaporator 15 heats the working fluid flowing in the evaporator 15 with combustion heat generated by a boiler 2 to generate a vapor of the working fluid, and also further heats the vapor to generate a superheated vapor. As a heat source to heat the working fluid, instead of the boiler 2, another heat source, such as exhaust heat, geothermal heat, and solar heat, may also be used. The evaporator 15 is an example of a heater in the present disclosure.

The expander 11 is a displacement expander or a turbo-expander. The displacement expander may include a scroll, rotary (including swing), vane, screw, or reciprocating expander. The turbo-expander may include a centrifugal or axial flow expander. The expander 11 is typically a displacement expander. In the expander 11, the working fluid is expanded. Thus, the expander 11 generates power. The expander 11 is coupled to, for example, a power generator (not shown) and carries out power generation by driving the power generator.

The condenser 13 has a condensing unit 13a and a cooling unit 13b. The condensing unit 13a configures a part of the main circuit 10 and the cooling unit 13b configures a part of a hot water circuit 30. The cooling unit 13b forms a flow passage of a cooling fluid to cool the working fluid expanded by the expander 11. That is, the condenser 13 has a flow passage of a cooling fluid to cool the working fluid expanded by the expander 11 and cools the working fluid with the cooling fluid for condensation. Specifically, the working fluid flowing in the condensing unit 13a is cooled by the cooling fluid flowing in the cooling unit 13b for condensation. The third temperature sensor 7c is a temperature sensor to detect a temperature of a cooling fluid (cold source temperature) at an outlet of the flow passage of the cooling fluid in the condenser 13. The condenser 13 is an example of a cooler in the present disclosure.

The hot water circuit 30 has a hot water pump 31, the cooling unit 13b, a hot water supply tank 32, and a radiator 34 and is formed by connecting these components in a loop. The hot water pump 31 supplies the cooling fluid to the cooling unit 13b. The cooling fluid supplied to the cooling unit 13b rises the temperature by heat exchange with the working fluid flowing in the condensing unit 13a and flows out of the cooling unit 13b. The flown-out cooling fluid falls the temperature by heat release in the hot water supply tank 32 or the radiator 34 and is supplied again to the cooling unit 13b by the hot water pump 31. In such a manner, it is possible to utilize the heat of the working fluid recovered in the condenser 13 for hot water supply or space heating. The cooling fluid is not limited in particular, and is water, for example. The cooling fluid may also be a liquid other than water or a gas, such as air.

The bypass passage 20 branches off from the main circuit 10 between an outlet of the evaporator 15 and an inlet of the expander 11. The bypass passage 20 branches joins the main circuit 10 between an outlet of the expander 11 and an inlet of the first heat exchange unit 12a. The flow adjustment mechanism 3 adjusts a flow rate of the working fluid in the bypass passage 20. While the Rankine cycle device 1 operates normally, the flow adjustment mechanism 3 adjusts the flow rate of the working fluid in the bypass passage 20 to minimum or zero. In contrast, when there is a risk of including the working fluid in the liquid phase in the outlet of the evaporator 15, the flow adjustment mechanism 3 adjusts the flow rate in the bypass passage 20 in such a manner that the working fluid bypasses the expander 11. In the present embodiment, the flow adjustment mechanism 3 includes a first on-off valve 3a and an expansion valve 3b. The first on-off valve 3a is provided between the inlet of the expander 11 and a position where the main circuit 10 and an upstream end of the bypass passage 20 are connected. The expansion valve 3b is provided in the bypass passage 20. The first on-off valve 3a is, for example, an electromagnetic on-off valve. The expansion valve 3b is, for example, a motorized expansion valve.

The first temperature sensor 7a is a temperature sensor to detect a temperature of the working fluid flowing to the inlet of the expander 11 from an outlet of the heat exchanger closest to the expander 11 in a direction opposite from a working fluid flowing direction in the working fluid circuit. It is thus possible that the first temperature sensor 7a detects the temperature of the working fluid at the inlet of the expander 11. In the present embodiment, a heat exchanger closest to the expander 11 from the direction opposite from the working fluid flowing direction in the working fluid circuit is the evaporator 15. The first temperature sensor 7a detects the temperature of the working fluid flowing to the inlet of the expander 11 from the outlet of the evaporator 15.

The second temperature sensor 7b is a temperature sensor to detect the temperature of the working fluid flowing to an inlet of the heat exchanger closest to the expander 11 in the working fluid flowing direction in the working fluid circuit from the outlet of the expander 11. It is thus possible that the second temperature sensor 7b detects the temperature of the working fluid in the outlet of the expander 11. In the present embodiment, the heat exchanger closest to the expander 11 in the working fluid flowing direction in the working fluid circuit is the first heat exchange unit 12a. The second temperature sensor 7b detects the temperature of the working fluid flowing from the outlet of the expander 11 to the inlet of the first heat exchange unit 12a. The second temperature sensor 7b detects the temperature of the working fluid, for example, flowing from a junction position where the bypass passage 20 joins the main circuit 10 to the inlet of the first heat exchange unit 12a.

The temperature sensor 7d is a temperature sensor to detect the temperature of the working fluid flowing to an inlet of the condensing unit 13a from an outlet of the first heat exchange unit 12a.

A control device 5 controls the expander 11. The control device 5 may be any device, so long as the control device 5 has a control function. The control device 5 includes an arithmetic processing unit (not shown) and a storage unit (not shown) storing control programs. Examples of the arithmetic processing unit include an MPU and CPU. The storage unit is a memory, for example. The control device 5 may be configured as a single controller performing centralized control, or may be configured as a group of multiple controllers performing distributed control in cooperation with each other. In order to receive signals indicating detection results of the first temperature sensor 7a, the second temperature sensor 7b, the third temperature sensor 7c, and the temperature sensor 7d, the control device 5 is connected to these temperature sensors. In addition, in order to send a predetermined control signal to the expander 11 and the flow adjustment mechanism 3, the control device 5 is connected to the expander 11 and the flow adjustment mechanism 3. For example, when the expander 11 is coupled to a power generator (not shown in the drawing), the control device 5 may be connected to the power generator in order to send a predetermined control signal to control the expander 11 to the power generator. The control device 5 controls behaviors of the expander 11 and the flow adjustment mechanism 3 based on a detection result of the first temperature sensor 7a, the second temperature sensor 7b, the third temperature sensor 7c, or the temperature sensor 7d. Specifically, the control device 5 receives signals indicating detection results of the first temperature sensor 7a, the second temperature sensor 7b, the third temperature sensor 7c, and the temperature sensor 7d, and based on the detection results, generates a control signal to control the expander 11 or the flow adjustment mechanism 3 for sending.

The control device 5 controls a number of rotation of the expander 11 based on a difference between a detected temperature of the first temperature sensor 7a and a detected temperature of the second temperature sensor 7b.

Specifically, the control device 5 may increase a number of rotation of the expander 11 when the difference increases. An excessive rise in a pressure difference between the inlet and the outlet of the expander 11 is thus alleviated. The control device 5 may also decrease a number of rotation of the expander 11 when the difference is decreased. An excessive decrease in a pressure difference between the inlet and the outlet of the expander 11 is thus alleviated.

Figure 2A:
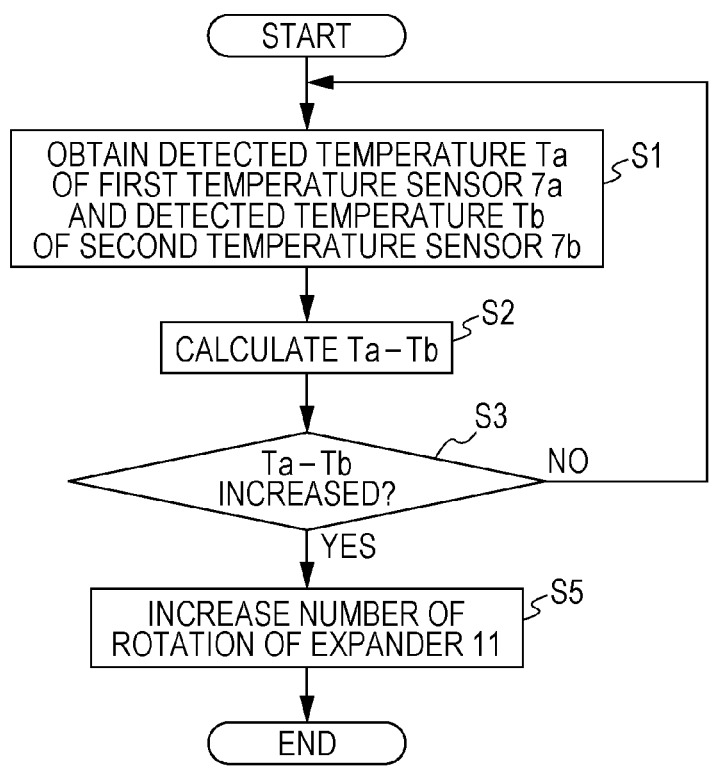
FIGS. 2A and 2B are flow charts illustrating control of an expander by a control device.

Specifically, as illustrated in FIG. 2A for example, the control device 5 controls a number of rotation of the expander 11. Firstly, the control device 5 obtains a detected temperature Ta of the first temperature sensor 7a and a detected temperature Tb of the second temperature sensor 7b respectively from the first temperature sensor 7a and the second temperature sensor 7b (step S1). Next, the control device 5 obtains a difference Ta–Tb between the detected temperature Ta of the first temperature sensor 7a and the detected temperature Tb of the second temperature sensor 7b (step S2). Next, the control device 5 determines whether or not the difference increases (step S3). When the difference increases (Yes in step S3), the control device 5 increases the number of rotation of the expander 11 (step S5) and goes back to step S1. Specifically, the control device 5 generates a control signal to increase the number of rotation of the expander 11 to send it to the expander 11. When the determination result in step S3 is No, the control device 5 maintains the number of rotation of the expander 11.

Figure 2B:
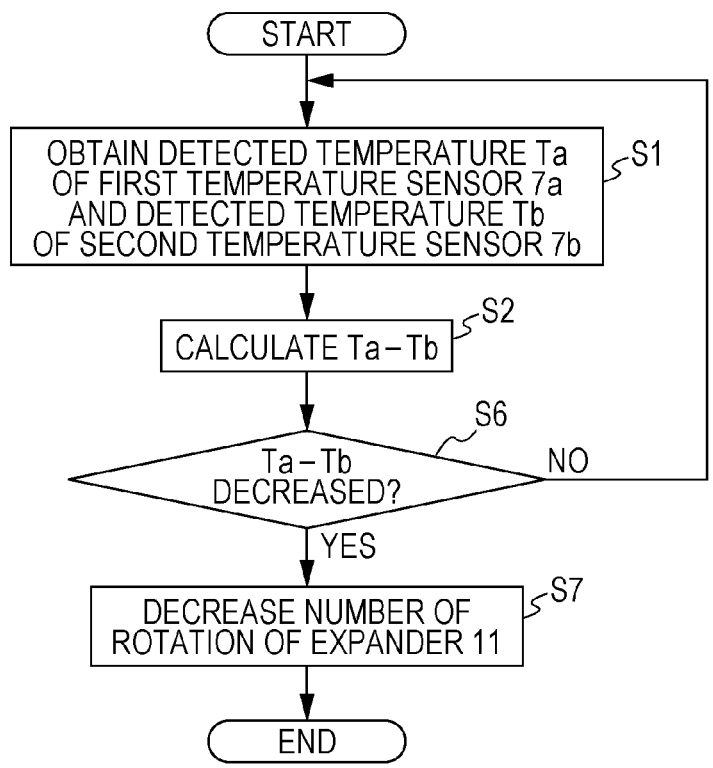

In addition, as illustrated in FIG. 2B for example, after performing step S1 and step S2 above, the control device 5 determines whether or not the temperature difference Ta–Tb decreases (step S6). When the determination result in step S6 is Yes, the control device 5 decreases the number of rotation of the expander 11 (step S7) and goes back to step S1. Specifically, the control device 5 generates a control signal to decrease the number of rotation of the expander 11 to send it to the expander 11. When the determination result in step S6 is No, the control device 5 maintains the number of rotation of the expander 11.

The control device 5 may also control the number of rotation of the expander 11 in accordance with various operating conditions of the Rankine cycle device 1.

The Rankine cycle device 1 is provided with, for example, a mechanical load reduction mode or a power generation efficiency priority mode as an operating mode. The control device 5 carries out control of the number of rotation of the expander 11 in accordance with the respective modes. The Rankine cycle device 1 may also be configured to be provided with a mechanical load reduction mode and a power generation efficiency priority mode as operating modes to allow a user to select these operating modes.

The control device 5 may decrease the number of rotation of the expander 11 when, for example, the temperature detected by the third temperature sensor 7c rises in the mechanical load reduction mode.

When a detected temperature Tc of the third temperature sensor 7c rises, the pressure of the working fluid at an outlet of the condenser 13 and eventually the pressure of the working fluid at the outlet of the expander 11 increase. At this time, the expander 11 increases the pressure difference (temperature difference) between the inlet and the outlet of the expander 11 in order to reduce a change in the ratio of expansion of the expander 11. Here, by decreasing the number of rotation of the expander 11 by the control device 5 when the temperature detected by the third temperature sensor 7c rises as described above, it is possible to reduce a gap of the ratio of expansion of the Rankine cycle device relative to the design expansion ratio of the expander.

Figure 3A:
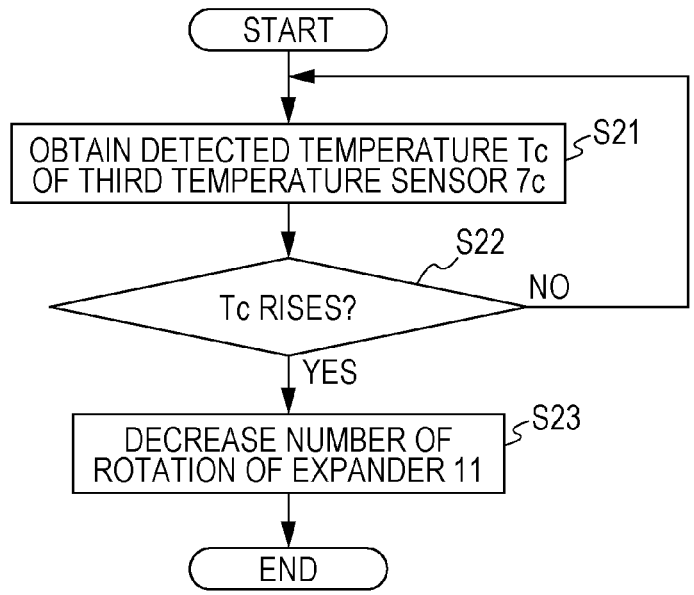
FIGS. 3A and 3B are flow charts illustrating control of an expander by a control device.

As a specific behavioral example, as illustrated in FIG. 3A, the control device 5 controls the number of rotation of the expander 11. Firstly, the control device 5 obtains the detected temperature Tc of the third temperature sensor 7c from the third temperature sensor 7c (step S21) and determines whether or not the detected temperature Tc rises (step S22). When the detected temperature Tc rises (Yes in step S22), the number of rotation of the expander 11 is decreased. In contrast, when the detected temperature Tc does not rise (No in step S22), the control device 5 maintains the number of rotation of the expander 11.

The control device 5 may also increase the number of rotation of the expander 11 when the temperature Tc detected by the third temperature sensor 7c lowers. When the detected temperature of the third temperature sensor lowers, the pressure at the outlet of the condenser and eventually the pressure at the outlet of the expander are lowered. At this time, the pressure on the inlet side of the expander 11 does not change when the outputs of the pump 14 and the expander 11 are constant, so that a difference between an intake pressure and a discharge pressure of the expander 11 becomes large and mechanical load on the expander 11 becomes large. Here, by increasing the number of rotation of the expander 11 by the control device 5 when the detected temperature Tc of the third temperature sensor 7c lowers as described above, it is possible to reduce the difference between the intake pressure of the expander 11 and the discharge pressure of the expander 11, and it is possible to reduce mechanical load on the expander 11.

Figure 3B:
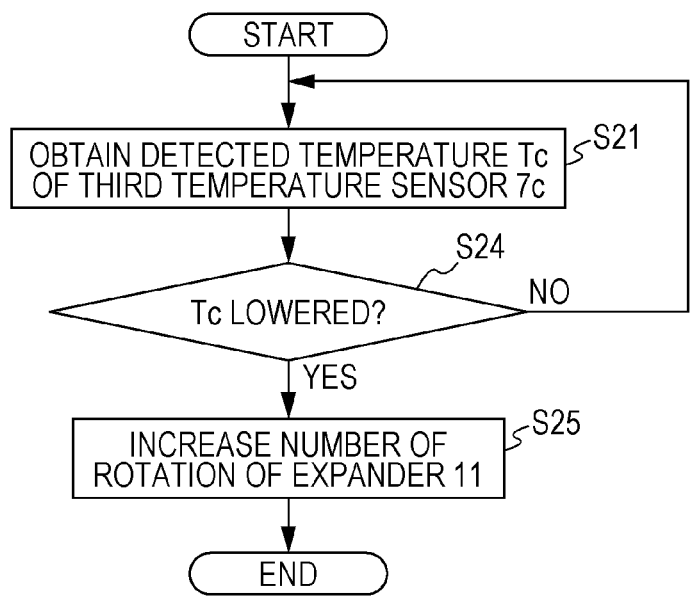

As a specific behavioral example, as illustrated in FIG. 3B, the control device 5 controls the number of rotation of the expander 11. Firstly, the control device 5 obtains the detected temperature Tc of the third temperature sensor 7c from the third temperature sensor 7c (step S21) and determines whether or not the detected temperature Tc lowers (step S24). When the detected temperature Tc lowers (Yes in step S24), the number of rotation of the expander 11 is increased. In contrast, when the detected temperature Tc does not lower (No in step S24), the control device 5 maintains the number of rotation of the expander 11.

The control device 5 may also decrease the number of rotation of the expander 11 when the detected temperature Tc of the third temperature sensor 7c lowers.

It is thus possible to operate the Rankine cycle device by keeping the evaporating pressure of the Rankine cycle device when the cold source temperature is low, for example, at the evaporating pressure of the Rankine cycle device when the cold source temperature is high or a pressure close to the evaporating pressure. Therefore, it is possible to operate the Rankine cycle device in a state where the efficiency of power generation is high.

Figure 4A:
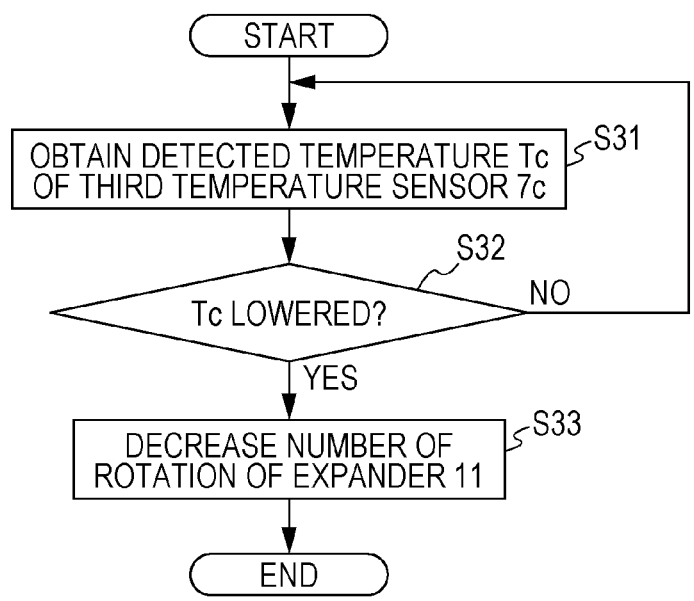
FIGS. 4A and 4B are flow charts illustrating control of an expander by a control device.

As a specific behavioral example, as illustrated in FIG. 4A, the control device 5 controls the number of rotation of the expander 11. Firstly, the control device 5 obtains the detected temperature Tc of the third temperature sensor 7c from the third temperature sensor 7c (step S31) and determines whether or not the detected temperature Tc lowers (step S32). When the detected temperature Tc lowers (Yes in step S32), the number of rotation of the expander 11 is decreased. In contrast, when the detected temperature Tc does not lower (No in step S32), the control device 5 maintains the number of rotation of the expander 11.

The control device 5 may also increase the number of rotation of the expander 11 when the detected temperature Tc of the third temperature sensor 7c rises in addition to decrease the number of rotation of the expander 11 when the detected temperature Tc of the third temperature sensor 7c lowers.

It is thus possible to perform control of the expander in a state of maintaining the pressure on the inlet side of the expander to an upper limit pressure or less. The upper limit pressure may be, for example, an upper limit pressure that is regulated by safety standards and the like.

Figure 4B:
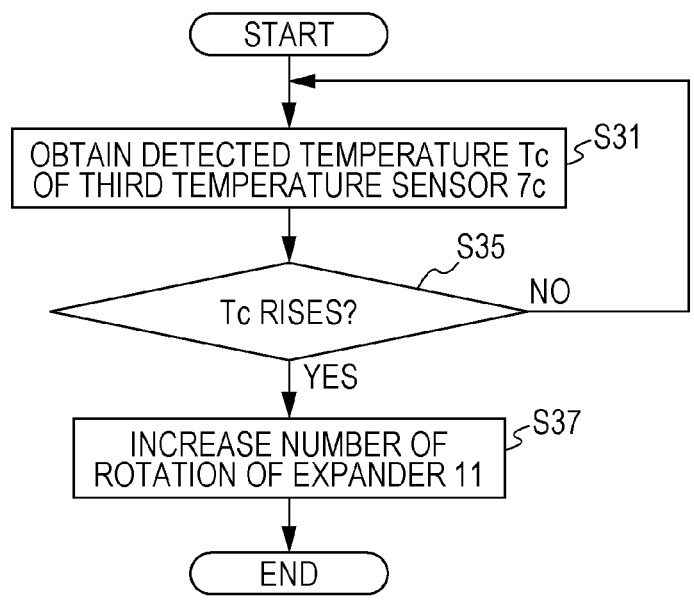

As a specific behavioral example, as illustrated in FIG. 4B in addition to FIG. 4A, the control device 5 controls the number of rotation of the expander 11. Firstly, the control device 5 obtains the detected temperature Tc of the third temperature sensor 7c from the third temperature sensor 7c (step S31) and determines whether or not the detected temperature Tc rises (step S35). When the detected temperature Tc rises (Yes in step S35), the number of rotation of the expander 11 is increased. In contrast, when the detected temperature Tc does not rise (No in step S35), the control device 5 maintains the number of rotation of the expander 11.

The control device 5 may also control the number of rotation of the expander 11 in such a manner that the difference between the detected temperature of the first temperature sensor 7a and the detected temperature of the second temperature sensor 7b get close to a target value. The target value is defined to match the difference between the detected temperature of the first temperature sensor 7a and the detected temperature of the second temperature sensor 7b with the target value when the Rankine cycle device 1 is operated in a predetermined target state. The control device 5 increases the number of rotation of the expander 11 when the difference is more than the target value and also decreases the number of rotation of the expander 11 when the difference is less than the target value. It is possible to change the number of rotation of the expander 11 by, for example, adjusting a rotation torque of the expander 11 by changing a current value of the power generator coupled to the expander 11. The target value may be defined as a specific value and may also be defined as a set of values having a predetermined range.

Figure 5:
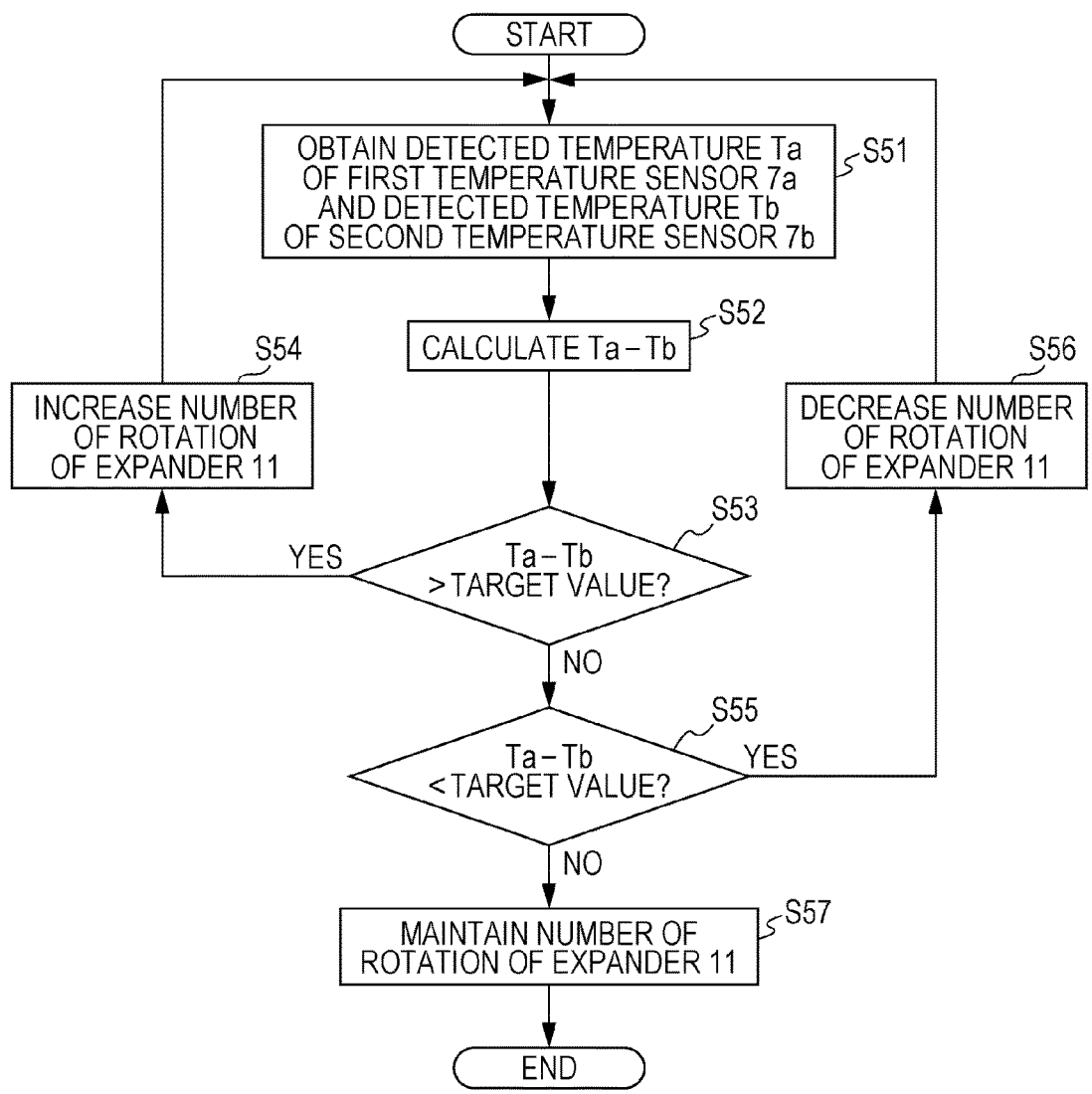
FIG. 5 is a flow chart illustrating control of an expander by a control device.

Specifically, as illustrated in FIG. 5 for example, the control device 5 controls the number of rotation of the expander 11. Firstly, the control device 5 obtains the temperature Ta detected by the first temperature sensor 7a and the temperature Tb detected by the second temperature sensor 7b respectively from the first temperature sensor 7a and the second temperature sensor 7b (step S51). Next, the control device 5 obtains a difference Ta−Tb between the detected temperature Ta of the first temperature sensor 7a and the detected temperature Tb of the second temperature sensor 7b (step S52). Next, the control device 5 determines whether or not the difference Ta−Tb is larger than a target value (step S53). When the determination result in step S53 is Yes, the control device 5 increases the number of rotation of the expander 11 (step S54) and goes back to step S51. Specifically, the control device 5 generates a control signal to increase the number of rotation of the expander 11 to send it to the expander 11. When the determination result in step S53 is No, the control device 5 determines whether or not the difference Ta−Tb is smaller than a target value (step S55). When the determination result in step S55 is Yes, the control device 5 decreases the number of rotation of the expander 11 (step S56) and goes back to step S51. Specifically, the control device 5 generates a control signal to decrease the number of rotation of the expander 11 to send it to the expander 11. When the determination result in step S55 is No, the control device 5 maintains the number of rotation of the expander 11 (step S57) and ends the process.

Figure 6:
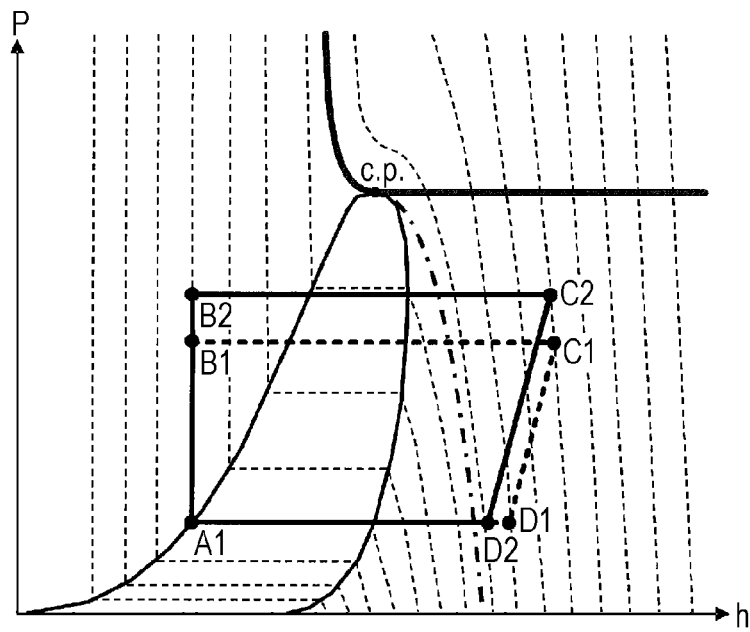
FIG. 6 is a Mollier chart illustrating an operating state of a Rankine cycle device.

When the Rankine cycle device 1 is operated in a target state, the working fluid flows in the main circuit 10 while changing in states of a point A1, a point B1, a point C1, and a point D1 as illustrated in FIG. 6. In an area between the outlet of the condenser 13 and an inlet of the pump 14 in the main circuit 10, the working fluid is in a state of a saturated liquid or a supercooled liquid as illustrated at the point A1. The working fluid is pressurized by the pump 14. In this case, the temperature of the working fluid hardly changes. Therefore, in an area between an outlet of the pump 14 and an inlet of the second heat exchange unit 12b in the main circuit 10, the working fluid is in a state of a supercooled liquid as illustrated at the point B1. The working fluid in the second heat exchange unit 12b is heated by the working fluid in the first heat exchange unit 12a. Therefore, in an area between an outlet of the second heat exchange unit 12b and an inlet of the evaporator 15 in the main circuit 10, the working fluid is in a state of a supercooled liquid at a temperature increased more than the temperature of the working fluid in the state illustrated at the point B1. In some cases, the working fluid is a wet vapor in which a gas and a liquid are mixed.

In the evaporator 15, the working fluid is superheated and changes to a superheated vapor. Therefore, in an area between the outlet of the evaporator 15 and the inlet of the expander 11 in the main circuit 10, the working fluid is in a state of a superheated vapor as illustrated at the point C1. The working fluid is adiabatically expanded in the expander 11. Therefore, between the outlet of the expander 11 and the inlet of the first heat exchange unit 12a in the main circuit 10, the working fluid is in a state of a superheated vapor as illustrated at the point D1. The working fluid in the first heat exchange unit 12a is cooled by the working fluid in the second heat exchange unit 12b. Therefore, at the outlet of the first heat exchange unit 12a and at an inlet of the condenser 13 in the main circuit 10, the working fluid is in a state of a superheated vapor at a temperature lower than the temperature of the working fluid in the state illustrated at the point D1. The working fluid condenses in the condenser 13. Therefore, in an area between the outlet of the condenser 13 and the inlet of the pump 14 in the main circuit 10, the working fluid is in a state of a saturated liquid or a supercooled liquid as illustrated at the point A1. In such a manner, when the Rankine cycle device 1 is operated in a target state, the difference between the detected temperature of the first temperature sensor 7a and the detected temperature of the second temperature sensor 7b match the target value. In FIG. 6, a thin broken line denotes an isothermal line, a dash-dotted line denotes a critical temperature curve of the working fluid, and c.p. denotes a critical point of the working fluid. The indications of these lines and the reference characters are same in FIG. 7.

When the difference between the detected temperature of the first temperature sensor 7a and the detected temperature of the second temperature sensor 7b is more than the target value, the working fluid flows in the main circuit 10 while changing in states of the point A1, a point B2, a point C2, and a point D2, for example. The areas in the main circuit 10 indicating the working fluid in the states of the point B2, the point C2, and the point D2 are same respectively as the areas in the main circuit 10 indicating the states of the working fluid at the point B1, the point C1, and the point D1. In this case, the evaporating pressure of the working fluid of the Rankine cycle device 1 is high and the ratio of expansion of the Rankine cycle device 1 is more than that in the target state. That is, that the difference between the detected temperature of the first temperature sensor 7a and the detected temperature of the second temperature sensor 7b is more than the target value indicates that the ratio of expansion of the Rankine cycle device 1 is expanded more than that in the target state. In such a manner, in the present embodiment, it is possible to evaluate the ratio of expansion of the Rankine cycle device 1 based on the difference between the detected temperature of the first temperature sensor 7a and the detected temperature of the second temperature sensor 7b. Therefore, it is possible to evaluate the ratio of expansion of the Rankine cycle device 1 with a relatively simple configuration where a pressure sensor does not have to be provided.

In this case, the control device 5 increases the number of rotation of the expander 11. The flow rate of the working fluid in the gas phase produced in the evaporator 15 from the expander 11 to the condenser 13 is thus increased. Since the mass of the working fluid flowing through the expander 11 to the condenser 13 becomes more than the mass of the working fluid evaporating in the evaporator 15, the evaporating pressure lowers and the ratio of expansion of the Rankine cycle device 1 gets closer to the ratio of expansion of the Rankine cycle device 1 in the target state. As a result, it is possible to operate the Rankine cycle device 1 in the target state or in a state close to the target state.

Figure 7:
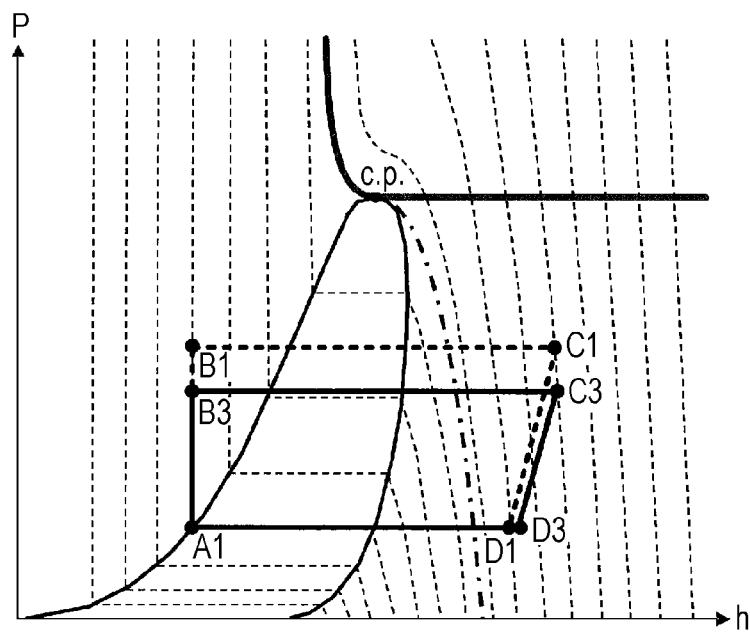
FIG. 7 is a Mollier chart illustrating an operating state of a Rankine cycle device.

When the difference between the detected temperature of the first temperature sensor 7a and the detected temperature of the second temperature sensor 7b is less than the target value, the working fluid flows in the main circuit 10 while changing in states at the point A1, a point B3, a point C3, and a point D3 as illustrated in FIG. 7, for example. The areas in the main circuit 10 indicating the working fluid in the states of the point B3, the point C3, and the point D3 are same respectively as the areas in the main circuit 10 indicating the states of the working fluid at the point B1, the point C1, and the point D1. In this case, the evaporating pressure of the working fluid in the Rankine cycle device 1 is low and the ratio of expansion of the Rankine cycle device 1 is less than that of the target state. That is, that the difference between the detected temperature of the first temperature sensor 7a and the detected temperature of the second temperature sensor 7b is less than the target value indicates that the ratio of expansion of the Rankine cycle device 1 is less than that in the target state.

In this case, the control device 5 decreases the number of rotation of the expander 11. The flow rate of the working fluid in the gas phase produced in the evaporator 15 from the expander 11 to the condenser 13 is thus decreased. Since the mass of the working fluid flowing through the expander 11 to the condenser 13 becomes less than the mass of the working fluid evaporated in the evaporator 15, the evaporating pressure lowers and the ratio of expansion of the Rankine cycle device 1 gets closer to the ratio of expansion of the Rankine cycle device 1 in the target state. As a result, it is possible to operate the Rankine cycle device 1 in the target state or in a state close to the target state.

The control device 5 may determine the above target value based on various operating conditions of the Rankine cycle device 1 and control the number of rotation of the expander 11 based on the determined target value. The control device 5 may also change the target value in accordance with a change in the operating conditions of the Rankine cycle device 1 and the like. For the determination or change of the target value, a table indicating relationship of the target value and the operating condition, for example, is stored in storage readable by the control device 5.

Figure 8:
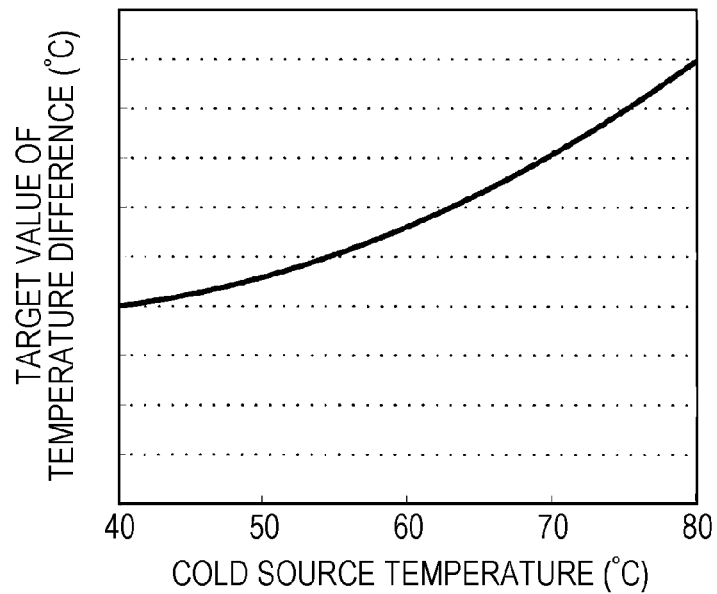
FIG. 8 is a graph illustrating relationship of a target value of a temperature difference and a cold source temperature.
Figure 9:
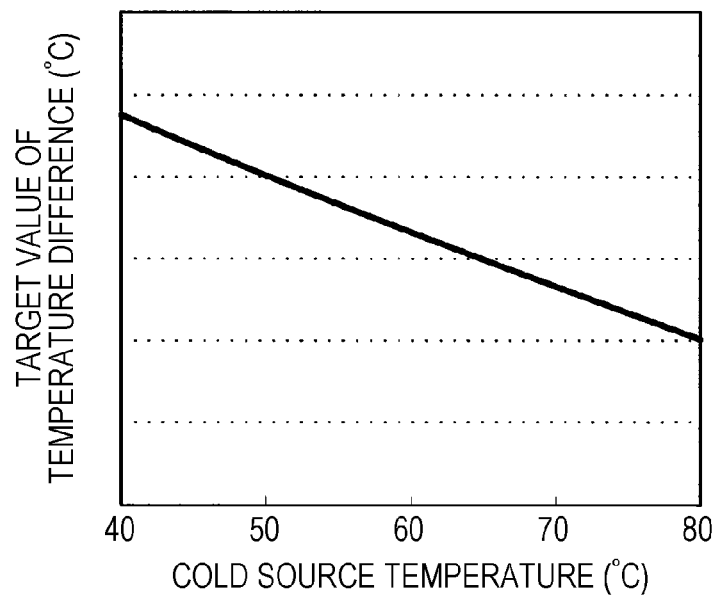
FIG. 9 is a graph illustrating relationship of a target value of a temperature difference and a cold source temperature.

The control device 5 determines the above target value based on, for example, the temperature detected by the third temperature sensor 7c and controls the number of rotation of the expander based on the determined target value. In this case, it is possible to define the above target value based on the cold source temperature detected by the third temperature sensor 7c. In addition, since it is possible to define the above target value considering the condensation pressure of the Rankine cycle device, it is possible to enhance the performance of the Rankine cycle device. For the determination of the target value, a table indicating relationship of the target value and the cold source temperature as illustrated in FIG. 8 or FIG. 9, for example, is stored in storage readable by the control device 5. That is, the control device 5 reads the table and obtains a target value corresponding to the temperature detected by the third temperature sensor 7c from the table to determine the target value.

In addition, the control device 5 changes the above target value in accordance with the change in the temperature detected by the third temperature sensor 7c and controls the number of rotation of the expander 11 based on the target value after the change. In this case, the control device 5 reads a table indicating relationship of the target value and the cold source temperature as illustrated in FIG. 8 or FIG. 9 and obtains a target value corresponding to the temperature detected by the third temperature sensor 7c from the table to change the target value. In addition, the control device 5 controls the number of rotation of the expander 11 in such a manner that the difference between the detected temperature of the first temperature sensor 7a and the detected temperature of the second temperature sensor 7b gets closer to the target value after the change.

Figure 10:
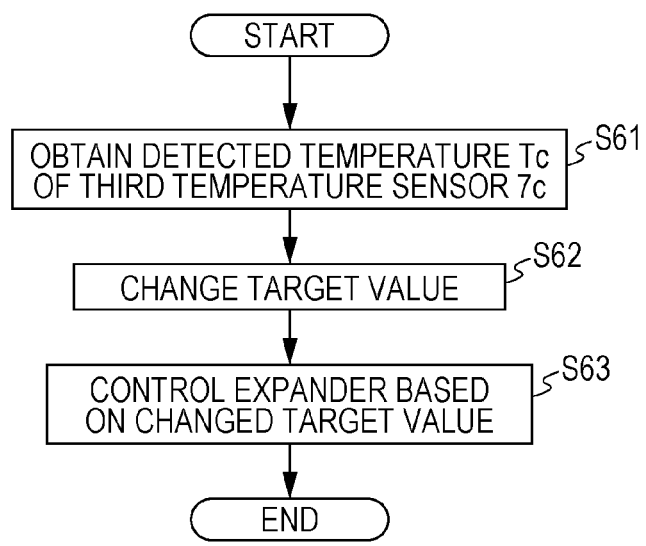
FIG. 10 is a flow chart illustrating control of an expander by a control device.

Specifically, the control device 5 controls the number of rotation of the expander 11 as illustrated in FIG. 10, for example. Firstly, the control device 5 obtains the detected temperature Tc of the third temperature sensor 7c from the third temperature sensor 7c (step S61). Next, the control device 5 determines the target value from the detected temperature Tc obtained in step S61 and changes the target value to the determined value (step S62). The control device 5 controls the expander 11 based on the changed target value (step S63). When the detected temperature Tc obtained in step S61 does not change, the target value does not have to be changed.

The Rankine cycle device 1 is provided with, for example, the mechanical load reduction mode or the power generation efficiency priority mode as the operating mode. The control device 5 carries out change of the target value and control of the number of rotation of the expander 11 in accordance with the respective mode. The Rankine cycle device 1 may also be configured to have the mechanical load reduction mode and the power generation efficiency priority mode as the operating modes to allow a user to select these operating modes.

In the mechanical load reduction mode, the control device 5 may also increase the target value when the temperature detected by the third temperature sensor 7c rises and control the number of rotation of the expander 11 based on the increased target value. That is, the control device 5 controls the number of rotation of the expander 11 in such a manner that the difference between the detected temperature of the first temperature sensor 7a and the detected temperature of the second temperature sensor 7b gets close to the increased target value. In this case, the control device 5 determines a new target value based on the temperature detected by the third temperature sensor 7c with reference to a table indicating relationship of the target value and the cold source temperature as illustrated in FIG. 8.

When the temperature detected by the third temperature sensor 7c rises, a condensation temperature of the Rankine cycle device 1 rises. When the ratio of expansion of the Rankine cycle device 1 is matched with the ratio of expansion of the expander 11, the intake pressure of the expander 11 increases in accordance with the condensation pressure increasing in accordance with the rise in the condensation temperature, that is, the discharge pressure of the expander 11. Here, in order to reduce the change in the ratio of expansion of the expander 11, a range of increasing the intake pressure of the expander 11 is larger than the range of increasing the discharge pressure of the expander 11. At this time, the pressure difference between the intake pressure and the discharge pressure of the expander 11 becomes large, so that the difference between the detected temperature of the first temperature sensor 7a and the detected temperature of the second temperature sensor 7b also becomes large. Therefore, the control device 5 changes the target value so as to increase the target value when the temperature detected by the third temperature sensor 7c rises.

Figure 11A:
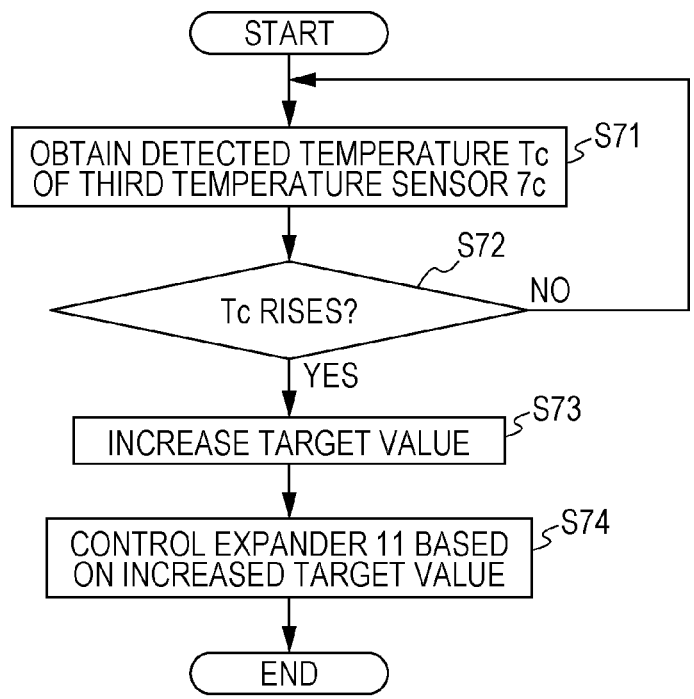
FIGS. 11A and 11B are flow charts illustrating control of an expander by a control device.

As a specific behavioral example, as illustrated in FIG. 11A, the control device 5 controls the number of rotation of the expander 11.

Firstly, the control device 5 obtains the detected temperature Tc of the third temperature sensor 7c from the third temperature sensor 7c (step S71) and determines whether or not the detected temperature Tc rises (step S72). When the detected temperature Tc rises (Yes in step S72), the target value is increased (step S73). The control device 5 controls the expander 11 based on the increased target value (step S74). In contrast, when the detected temperature Tc does not rise (No in step S72), the control device 5 maintains the target value.

In addition, when the temperature detected by the third temperature sensor 7c lowers, the control device 5 decreases the target value. Further, the control device 5 may also control the number of rotation of the expander 11 based on the decreased target value. That is, the control device 5 controls the number of rotation of the expander 11 and makes the difference between the detected temperature of the first temperature sensor 7a and the detected temperature of the second temperature sensor 7b closer to the decreased target value. In this case, the control device 5 determines a new target value based on the temperature detected by the third temperature sensor 7c with reference to a table indicating relationship of a target value and a cold source temperature as illustrated in FIG. 8.

When the temperature detected by the third temperature sensor 7c lowers, the condensation temperature of the Rankine cycle device 1 lowers. When the ratio of expansion of the Rankine cycle device 1 is matched with the ratio of expansion of the expander 11, the intake pressure of the expander 11 is lowered in accordance with the condensation pressure lowered in accordance with the lowering of the condensation temperature, that is, the discharge pressure of the expander 11. At this time, in order to reduce the change in the ratio of expansion of the expander 11, the range of lowering the intake pressure of the expander 11 is larger than the range of lowering the discharge pressure of the expander 11. At this time, the pressure difference between the intake pressure and the discharge pressure of the expander 11 becomes smaller, so that the difference between the detected temperature of the first temperature sensor 7a and the detected temperature of the second temperature sensor 7b is diminished. Therefore, when the temperature detected by the third temperature sensor 7c lowers, the control device 5 changes the target value so as to decrease the target value. Since the difference between the intake pressure of the expander 11 and the discharge pressure of the expander 11 is diminished in the operating condition where the cold source temperature is low, it is possible to reduce the mechanical load on the expander 11. As a result, it is possible to enhance the reliability of the Rankine cycle device 1.

Figure 11B:
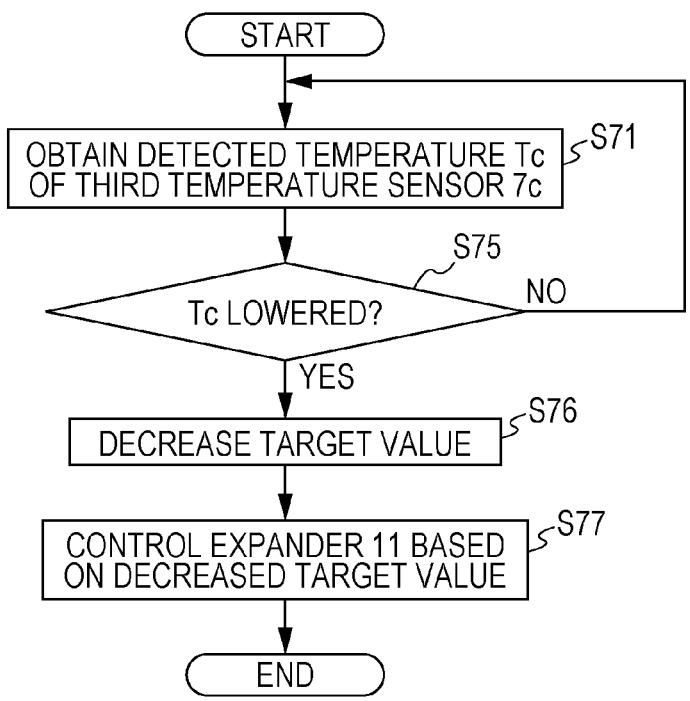

As a specific behavioral example, as illustrated in FIG. 11B, the control device 5 controls the number of rotation of the expander 11.

Firstly, the control device 5 obtains the detected temperature Tc of the third temperature sensor 7c from the third temperature sensor 7c (step S71) and determines whether or not the detected temperature Tc lowers (step S75). When the detected temperature Tc lowers (Yes in step S75), the target value is decreased (step S76). The control device 5 controls the expander 11 based on the decreased target value (step S77). In contrast, when the detected temperature Tc does not lower (No in step S75), the control device 5 maintains the target value.

In the power generation efficiency priority mode, when the temperature detected by the third temperature sensor 7c lowers, the target value is increased. Further, the control device 5 controls the number of rotation of the expander 11 based on the increased target value. That is, the control device 5 controls the number of rotation of the expander 11 and makes the difference between the detected temperature of the first temperature sensor 7a and the detected temperature of the second temperature sensor 7b closer to the increased target value. In this case, the control device 5 determines a new target value based on the temperature detected by the third temperature sensor 7c with reference to a table indicating relationship of a target value and a cold source temperature as illustrated in FIG. 9.

When the temperature detected by the third temperature sensor 7c lowers, the condensation temperature of the Rankine cycle device 1 lowers. In association with this, the condensation pressure of the Rankine cycle device 1, that is, the discharge pressure of the expander 11 lowers. At this time, the control device 5 increases the target value, so that lowering of the evaporating pressure of the Rankine cycle device 1 is suppressed even when the condensation pressure of the Rankine cycle device 1 lowers. In such a manner, while the cold source temperature is low, it is possible to operate the Rankine cycle device 1 by keeping the evaporating pressure of the Rankine cycle device 1 at the evaporating pressure of the Rankine cycle device 1 when the cold source temperature is high or a pressure close to the evaporating pressure. In this case, since the expansion of the working fluid is insufficient, the efficiency of the expander 11 lowers to a certain extent. However, the theoretical amount of recovered power of the Rankine cycle increases more than that, so that it is possible to enhance the power generation efficiency of the Rankine cycle device 1.

Figure 12A:
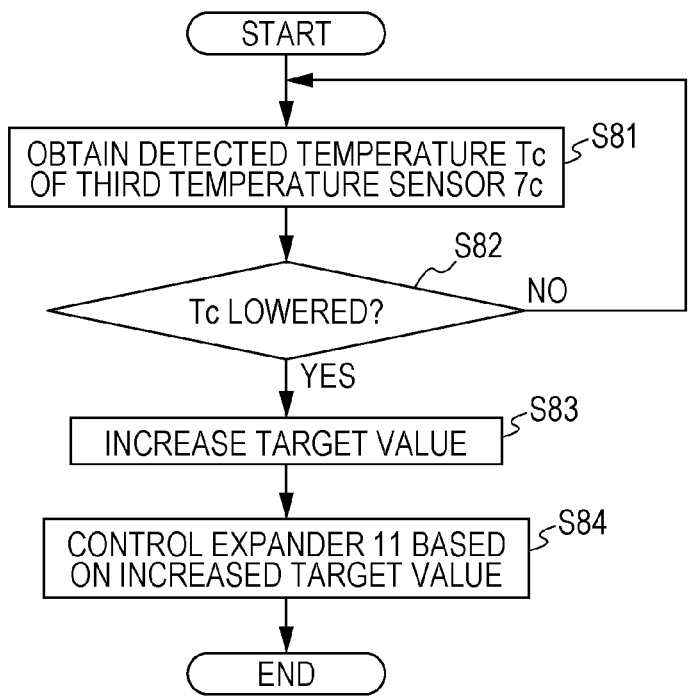
FIGS. 12A and 12B are flow charts illustrating control of an expander by a control device.

As a specific behavioral example, as illustrated in FIG. 12A, the control device 5 controls the expander 11. Firstly, the control device 5 obtains the detected temperature Tc of the third temperature sensor 7c from the third temperature sensor 7c (step S81) and determines whether or not the detected temperature Tc lowers (step S82). When the detected temperature Tc lowers (Yes in step S82), the target value is increased (step S83). The control device 5 controls the expander 11 based on the decreased target value (step S84). In contrast, when the detected temperature Tc does not lower (No in step S82), the control device 5 maintains the target value.

When the temperature detected by the third temperature sensor 7c rises, the control device 5 may also decrease the target value even more and control the number of rotation of the expander 11 based on the decreased target value.

It is thus possible to perform control of the expander 11 in a state of maintaining the pressure on the inlet side of the expander 11 at an upper limit pressure or less. The upper limit pressure may also be an upper limit pressure that is regulated by safety standards and the like, for example.

Figure 12B:
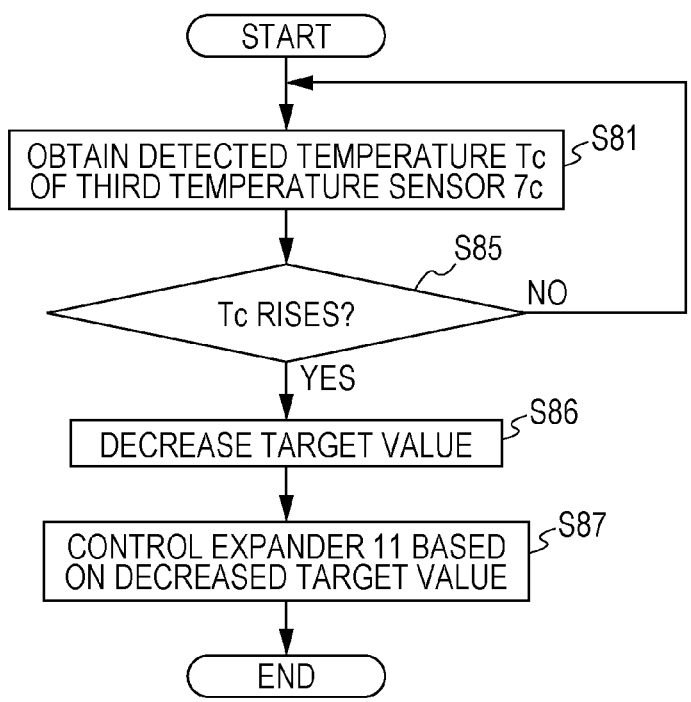
Figure 13:
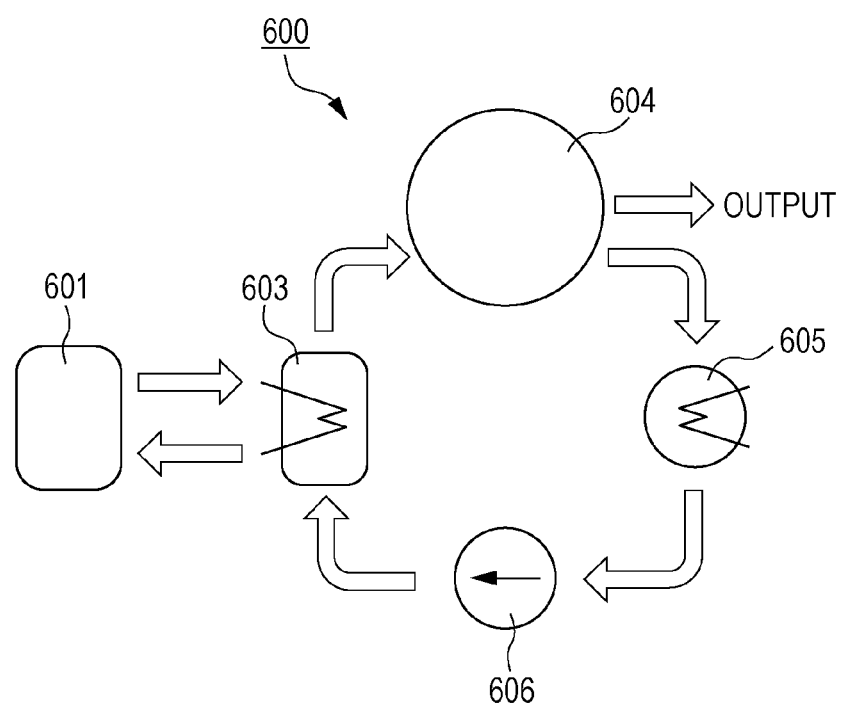
FIG. 13 is a configuration diagram of a conventional Rankine cycle device.

As a specific behavioral example, as illustrated in FIG. 12B, the control device 5 controls the expander 11. Firstly, the control device 5 obtains the detected temperature Tc of the third temperature sensor 7c from the third temperature sensor 7c (step S81) and determines whether or not the detected temperature Tc rises (step S85). When the detected temperature Tc rises (Yes in step S85), the target value is decreased (step S86). The control device 5 controls the expander 11 based on the decreased target value (step S87). In contrast, when the detected temperature Tc does not rise (No in step S85), the control device 5 maintains the target value.

Depending on the operating status of the Rankine cycle device 1, there is a possibility of including the working fluid in the liquid phase at the outlet of the evaporator 15. For example, in an initial stage of activating operation of the Rankine cycle device 1, the working fluid at the outlet of the evaporator 15 is in a state of a wet vapor. In addition, in a stopping operation of the Rankine cycle device 1, there is a case of supplying the working fluid in the liquid phase to the evaporator 15 by the pump 14 to cool the evaporator 15 after stopping heating of the evaporator 15. Further, there is also a possibility of changing the working fluid to a state of a wet vapor at the outlet of the evaporator 15 due to variation in the amount of heating in the evaporator 15 and the like. When the working fluid in the liquid phase is supplied to the expander 11, the reliability of the Rankine cycle device 1 turns out to be lowered due to thinning, abrasion, and the like of parts of the expander 11 by flowing or droplet of oil for lubrication in the expander 11. Therefore, in such case, the control device 5 controls the flow adjustment mechanism 3 in such a manner that the working fluid flows in the bypass passage 20 by bypassing the expander 11.

When the difference between the detected temperature of the second temperature sensor 7b and the detected temperature of the temperature sensor 7d exceeds a predetermined value (for example, 5° C.), the control device 5 controls the flow adjustment mechanism 3 in such a manner that the flow rate of the working fluid in the bypass passage 20 becomes minimum or zero. Specifically, the control device 5 opens an on-off valve 3a to minimize the opening of the expansion valve 3b. When the difference between the detected temperature of the second temperature sensor 7b and the detected temperature of the temperature sensor 7d exceeds a predetermined value (for example, 5° C.), heat exchange occurs between the first heat exchange unit 12a and the second heat exchange unit 12b. In this case, the working fluid flowing in the first heat exchange unit 12a is in a state of a superheated vapor, and the working fluid at the outlet of the evaporator 15 is also in a state of a superheated vapor. Therefore, most of the working fluid in a state of a superheated vapor is supplied to the expander 11 to generate power.

When the difference between the detected temperature of the second temperature sensor 7b and the detected temperature of the temperature sensor 7d is a predetermined value (for example, 5° C.) or less, the control device 5 controls the flow adjustment mechanism 3 in such a manner that the working fluid flows in the bypass passage 20 by bypassing the expander 11. Specifically, the control device 5 closes the on-off valve 3a to adjust the opening of the expansion valve 3b to predetermined opening. It is thus possible to prevent the working fluid in the liquid phase from being supplied to the expander 11.

<Modifications>

It is possible to modify the Rankine cycle device 1 above from various perspectives. For example, a superheater may also be provided in an area between the outlet of the evaporator 15 and the inlet of the expander 11 in the main circuit 10. In this case, the superheater is equivalent to a heat exchanger closest to the expander 11 in a direction opposite from the working fluid flowing direction in the working fluid circuit. Accordingly, in this case, the first temperature sensor 7a detects the temperature of the working fluid flowing from an outlet of the superheater to the inlet of the expander 11.

In addition, the first heat exchange unit 12a and the second heat exchange unit 12b may be omitted. In this case, the condenser 13 is equivalent to a heat exchanger closest to the expander 11 in a working fluid flowing direction in the working fluid circuit. Accordingly, in this case, the second temperature sensor 7b detects the temperature of the working fluid flowing from the outlet of the expander 11 to the inlet of the condenser 13. Further, the temperature sensor 7d is better provided in an area, for example, between the outlet of the condenser 13 and the inlet of the evaporator 15 in the main circuit 10. In this case as well, it is possible that the control device 5 controls the flow adjustment mechanism 3 similar to the above embodiment based on the difference between the detected temperature of the second temperature sensor 7b and the detected temperature of the temperature sensor 7d.

In addition, when the temperature of the working fluid sensed by the first temperature sensor 7a installed upstream the expander 11 becomes an upper limit value or more, combustion of the boiler 2 is stopped. As the upper limit value, a value lower than at least one of a heat resistant temperature of the working fluid, a heat resistant temperature of a material used for the expander 11, and a heat resistant temperature of oil is set. Thus, the possibility of excessive rise in the temperature of the working fluid is reduced.

When the heat resistant temperature of a material used for the expander 11 is lower than the heat resistant temperatures of the working fluid and the oil, the expansion valve 3b may be opened and the first on-off valve 3a may be closed as the temperature sensed by the first temperature sensor 7a becomes the above upper limit temperature or more to flow the working fluid in the bypass passage 20. Thus, the expander 11 is protected. When the temperature sensed by the first temperature sensor 7a becomes at least one of the above heat resistant temperatures or more, next activation is prohibited. As an inspection is carried out by an operator and it is confirmed that there is no defect and the activation prohibiting state is released, the process goes on to a standby state to wait for next activation.

In the case that the value detected by the second temperature sensor 7b does not change even when the number of rotation of the expander 11 is changed (increased or decreased) or the case that the value detected by the second temperature sensor 7b does not change even when the value of the first temperature sensor 7a is changed, it is estimated that the outlet of the expander 11 is in a gas-liquid two phase state, so that the number of rotation of the pump 14 may be lowered to increase superheating of the working fluid passing through the expander 11. The liquid phase thus occurs due to condensation of the working fluid by the insufficient superheating in the expansion process in the expander 11 and it becomes possible to reduce the possibility of flowing the oil in a sliding portion of the expander 11.

When the temperature of the working fluid detected by the first temperature sensor 7a is lower than a set temperature, it is desired to lower the number of rotation of the pump 14. This is to suppress that the temperature of the working fluid passing through the evaporator 15 excessively rises due to the lowering of the number of rotation of the pump 14 to create a problem in the Rankine cycle device. Here, the set temperature may be set as a value lower than, for example, at least one of the heat resistant temperature of the working fluid, the heat resistant temperature of the material used for the expander 11, and the heat resistant temperature of the oil.

What is claimed is:

1. A Rankine cycle device comprising:
   a heater that generates a superheated vapor of a working fluid;
   an expander that expands the working fluid passed through the heater;
   a cooler that cools the working fluid passed through the expander;
   a first temperature sensor that detects a temperature of the working fluid flowing from an outlet of the heater to an inlet of the expander;
   a second temperature sensor that detects a temperature of the working fluid flowing from an outlet of the expander to an inlet of the cooler; and
   a controller including a processor and a memory storing a program,
   wherein the program, when executed by the processor, causes the controller to control a number of rotation of the expander based on a difference between the detected temperature of the first temperature sensor and the detected temperature of the second temperature sensor.

2. The Rankine cycle device according to claim 1, wherein
   the program, when executed by the processor, further causes the controller to increase the number of rotation of the expander when the difference increases.

3. The Rankine cycle device according to claim 1, wherein
   the program, when executed by the processor, further causes the controller to decrease the number of rotation of the expander when the difference decreases.

4. The Rankine cycle device according to claim 1, wherein
   the program, when executed by the processor, further causes the controller to control the number of rotation of the expander to make the difference closer to a target value.

5. The Rankine cycle device according to claim 4, wherein
   the program, when executed by the processor, further causes the controller to increase the number of rotation of the expander when the difference is more than the target value.

6. The Rankine cycle device according to claim 4, wherein
   the program, when executed by the processor, further causes the controller to decrease the number of rotation of the expander when the difference is less than the target value.

7. The Rankine cycle device according to claim 2, wherein
   the cooler includes a condenser that has a flow passage of a cooling fluid for condensation and that cools the working fluid by the cooling fluid,
   the Rankine cycle device further includes a third temperature sensor that detects a temperature of the cooling fluid after passing through the condenser, and
   the program, when executed by the processor, further causes the controller to decrease the number of rotation of the expander when the detected temperature of the third temperature sensor rises.

8. The Rankine cycle device according to claim 7 wherein
   the program, when executed by the processor, further causes the controller to increase the number of rotation of the expander when the temperature detected by the third temperature sensor lowers.

9. The Rankine cycle device according to claim 2, wherein
   the cooler includes a condenser that has a flow passage of a cooling fluid for condensation and that cools the working fluid by the cooling fluid,
   the Rankine cycle device further includes a third temperature sensor that detects a temperature of the cooling fluid after passing through the condenser, and
   the program, when executed by the processor, further causes the controller to increase the number of rotation of the expander when the detected temperature of the third temperature sensor rises and also to decrease the number of rotation of the expander when the detected temperature of the third temperature sensor lowers.

10. The Rankine cycle device according to claim 4, wherein
    the cooler includes a condenser that has a flow passage of a cooling fluid for condensation and that cools the working fluid by the cooling fluid,
    the Rankine cycle device further includes a third temperature sensor that detects a temperature of the cooling fluid after passing through the condenser, and
    the program, when executed by the processor, further causes the controller to set the target value in accordance with the temperature detected by the third temperature sensor and to control the number of rotation of the expander based on the set target value.

11. The Rankine cycle device according to claim 10, wherein the program, when executed by the processor, further causes the controller to increase the target value when the detected temperature of the third temperature sensor rises and to control the number of rotation of the expander based on the increased target value.

12. The Rankine cycle device according to claim 10, wherein
the program, when executed by the processor, further causes the controller to decrease the target value when the temperature detected by the third temperature sensor lowers and to control the number of rotation of the expander based on the decreased target value.

13. The Rankine cycle device according to claim 10, wherein
the program, when executed by the processor, further causes the controller to increase the target value when the detected temperature of the third temperature sensor lowers and to control the number of rotation of the expander based on the increased target value.

\* \* \* \* \*